Figure 1:
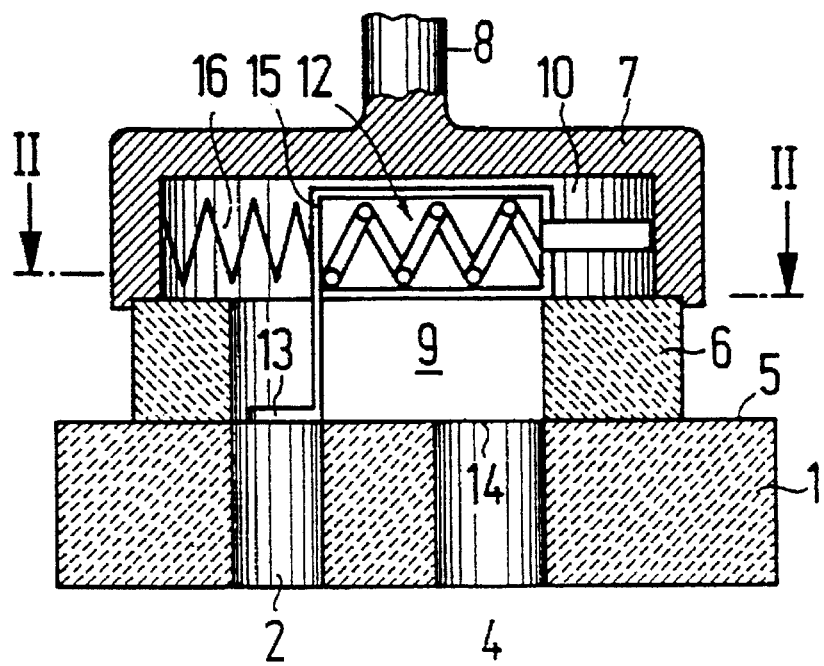

United States Patent [19]
Lorch

[11] Patent Number: 5,647,530
[45] Date of Patent: Jul. 15, 1997

[54] ANTI-SCALD SANITARY VALVE

[75] Inventor: Werner Lorch, Schramberg, Germany

[73] Assignee: Hans Grohe GmbH & Co. KG, Germany

[21] Appl. No.: 498,904

[22] Filed: Jul. 6, 1995

[30]   Foreign Application Priority Data

Jul. 7, 1994 [DE] Germany .................. 44 23 852.5

[51] Int. Cl.⁶ ............................................. G05D 23/13
[52] U.S. Cl. ............... 236/12.14; 236/93 B; 236/12.16; 137/625.41; 137/625.15
[58] Field of Search ................ 236/93 B, 93 R, 236/12.14, 12.16, 12.23; 137/625.14, 625.15, 625.17, 625.41

[56]              References Cited

U.S. PATENT DOCUMENTS

| 1,879,344 | 9/1932 | Lawler | 236/12.14 |
| 2,803,408 | 8/1957 | Hope | 236/12.14 |
| 5,141,153 | 8/1992 | Jeffreess | 236/93 |

FOREIGN PATENT DOCUMENTS

| 2384187 | 10/1978 | France . |
| 2402141 | 3/1979 | France . |
| 1097227 | 12/1961 | Germany . |
| 3108419 | 9/1982 | Germany . |
| 3500564 | 4/1986 | Germany . |
| 3600383 | 7/1986 | Germany . |
| 3606097 | 8/1987 | Germany . |
| 3834153 | 4/1989 | Germany . |
| 4014849 | 11/1991 | Germany . |
| 4019233 | 12/1991 | Germany . |
| 4039623 | 6/1992 | Germany . |
| 0629393 | 10/1978 | U.S.S.R. . |
| 1343100 | 1/1974 | United Kingdom . |
| 2209200 | 5/1989 | United Kingdom . |

OTHER PUBLICATIONS

Patents Abstract of Japan, Mar. 2, 1984,vol. 8/No. 47.

*Primary Examiner*—John M. Sollecito
*Attorney, Agent, or Firm*—Eckert Seamans Cherin & Mellott

[57]             ABSTRACT

A sanitary valve contains a valve housing with a fixed control surface and a hot water intake. In the valve housing is provided a control element, which controls the water quantity leaving the valve. According to the invention the sanitary valve contains a scalding protection, which is arranged and constructed on the control element in such a way that on exceeding a predetermined temperature it reduces or prevents the passage of water through a hot water-carrying opening.

19 Claims, 4 Drawing Sheets

ANTI-SCALD SANITARY VALVE

DESCRIPTION

The invention relates to a sanitary valve having a valve housing, which has a fixed control surface and a hot water intake, as well as having a control element controlling the quantity of water leaving the valve and which is movably positioned with respect to the housing with at least one degree of freedom.

In the case of valves of this type, which can e.g. be mixer valves, there is a risk of a user being alarmed or even injured by unexpectedly hot water.

Numerous possibilities have already been proposed for preventing this, including devices which mechanically limit the opening position of the valve, as well as thermostatic valves.

A scalding protection device is also known (DE-OS 31 08 419), which can e.g. be inserted in a shower line. It contains a temperature-controlled member, which releases a pretensioned closure element on exceeding a given temperature and which closes the line in jerky manner. When the temperature decreases again an automatic resetting is not possible.

The problem of the invention is to provide a sanitary mixer valve, particularly of the aforementioned type, which in the case of a simple and space-saving construction and very simple operation provides protection against excessive temperatures.

For solving this problem the invention proposes a sanitary valve having the features given in claim 1. Further developments of the invention form the subject matter of subclaims.

Thus, the sanitary valve proposed by the invention contains a scalding protection automatically responding to excessive temperatures and which acts within the sanitary valve and brings about a temperature limitation by closing or constricting the opening through which the hot water passes. Therefore the user does not have to carry out a special handling of the valve before or after the removal of water. Thus, the valve provides automatic protection against excessive temperatures without this being noticed.

The valve proposed by the invention can in particular be a mixer valve, i.e. where there is an intake for hot water and an intake for cold water.

It can in particular be a single lever mixer valve, in which the control element for controlling the temperature and quantity of the water leaving the valve is movable with two degrees of freedom.

According to a further development of the invention the scalding protection has a temperature-sensitive element exposed to the temperature of the water downstream of the intake and in particular the temperature of the mixed water. This temperature-sensitive element responds to the temperature of the water and on reaching a given temperature limit can carry out the aforementioned reduction or constriction of the hot water.

It can in particular be possible for the temperature element to move mechanically in the case of a temperature change, i.e., for example expanding or contracting or being deflected in another direction. The temperature-sensitive element can then be used for establishing the temperature limit and for the direct mechanical initiation of a control process.

According to a further development of the invention the valve has a valve element located on the control element, particularly the movable control surface and which is movable relative to the movable control surface and is subject to the action of the temperature element. Thus, in this case on reaching the temperature limit said valve element is displaced and can e.g. close the hot water intake without the control element being operated or moved in any way.

The valve element can in particular be positioned and constructed in such a way that it can close the hot water intake issuing into the fixed control surface.

It is also possible and is proposed by the invention that the valve element can be constructed for closing an intake for the hot water in the movable control surface.

According to a further development of the invention, the valve has an operating element subject to the action of the temperature-sensitive element and which is constructed and positioned for moving the control element and/or the movable control surface. In this case the normal operating kinematics of the valve can be used for providing the scalding protection. This means that optionally the user can also detect that there has been an intervention in the function of the valve.

The operating element can be placed on the housing and acts on the control element and/or the movable control surface.

It is also possible to place the operating element on the control element and/or the movable control surface, so that it then acts on the housing or part of the housing. This action on the housing can take place directly or by means of intermediate members.

According to the invention it can be provided that the operating element subject to the action of the temperature-sensitive element is so constructed that the control element moves in the direction of a closure of the mixer valve. In many conventional single lever mixer valves the closing of the valve is a translatory movement, whereas a rotary movement is necessary for changing the temperature. The translatory movement by the temperature-sensitive element can optionally be brought about more simply.

However, the invention also proposes that the operating element subject to the action of the temperature-sensitive element can be so constructed that it moves the control element in the sense of reducing the temperature.

The sanitary valve proposed by the invention and having a scalding protection can e.g. be a sanitary valve with a turning grip for the hot water and a turning grip for the cold water. When constructed as a single lever mixer valve it can, according to the invention, be provided with two flat, in particular planar control disks. In this case it can be provided that the two intakes issue into the control surface of the fixed control disk, whereas the movable control disk with the aid of recesses, edges, breaks, etc. brings about a control of the quantity and temperature of the outflowing water. It is naturally also possible that the return of the mixed water takes place through the fixed control disk.

According to the invention the temperature-sensitive element can be positioned in a control recess of the movable control disk and is consequently directly exposed to the mixed water temperature.

However, the valve proposed by the invention can also be constructed as a so-called ball plug valve, in which the control surfaces are spherical surfaces. With particular advantage the invention proposes here that the temperature-sensitive element is located within the ball. This means an extremely space-saving arrangement of the temperature-sensitive element, so that there is no need to change the size and optionally the design of the mixer valve. The optionally provided valve element can also be located in the ball.

For a particularly good response characteristic of the scalding protection proposed by the invention the temperature-sensitive element or part of the temperature-sensitive element can be constituted by a spring made from a shape memory alloy (SMA). Such materials perform a large shape change in a specific narrow temperature range. Thus, a spring made from a shape memory alloy at a specific temperature, namely the predetermined temperature, can bring about a jerky rise of the spring tension, so that the spring not only acts as a temperature sensor, but simultaneously as the element performing a mechanical movement. It is particularly advantageous if opposite to the SMA spring is provided a normal spring, which produces a state of equilibrium, which can only be overcome on reaching the predetermined temperature.

Further features, details and advantages of the invention can be gathered from the claims, whose wording is made by incorporation into the content of the description, the following description of a preferred embodiment and the attached drawings, wherein show:

FIG. 1 A highly simplified, diagrammatic cross-section through part of a mixer valve with a fixed and a movable control disk.

Figure 2:
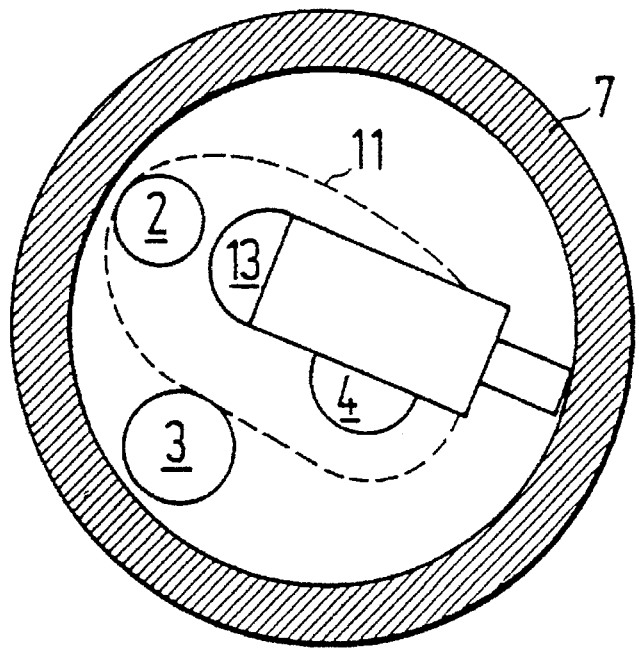

FIG. 2 A section through the arrangement of FIG. 1 along line II—II in FIG. 2.

Figure 3:
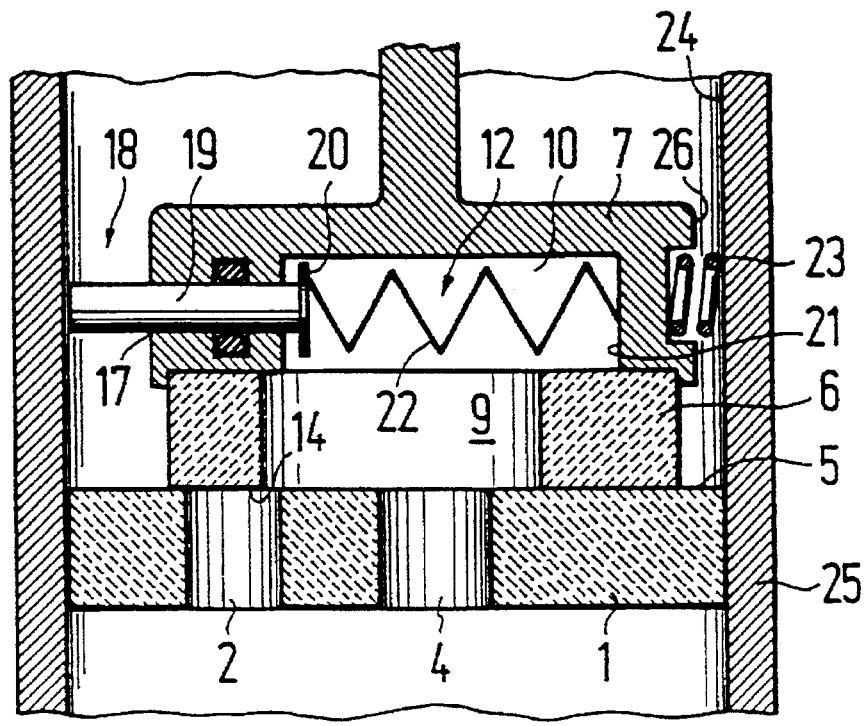

FIG. 3 A section corresponding to FIG. 1 of a second embodiment.

Figure 4:
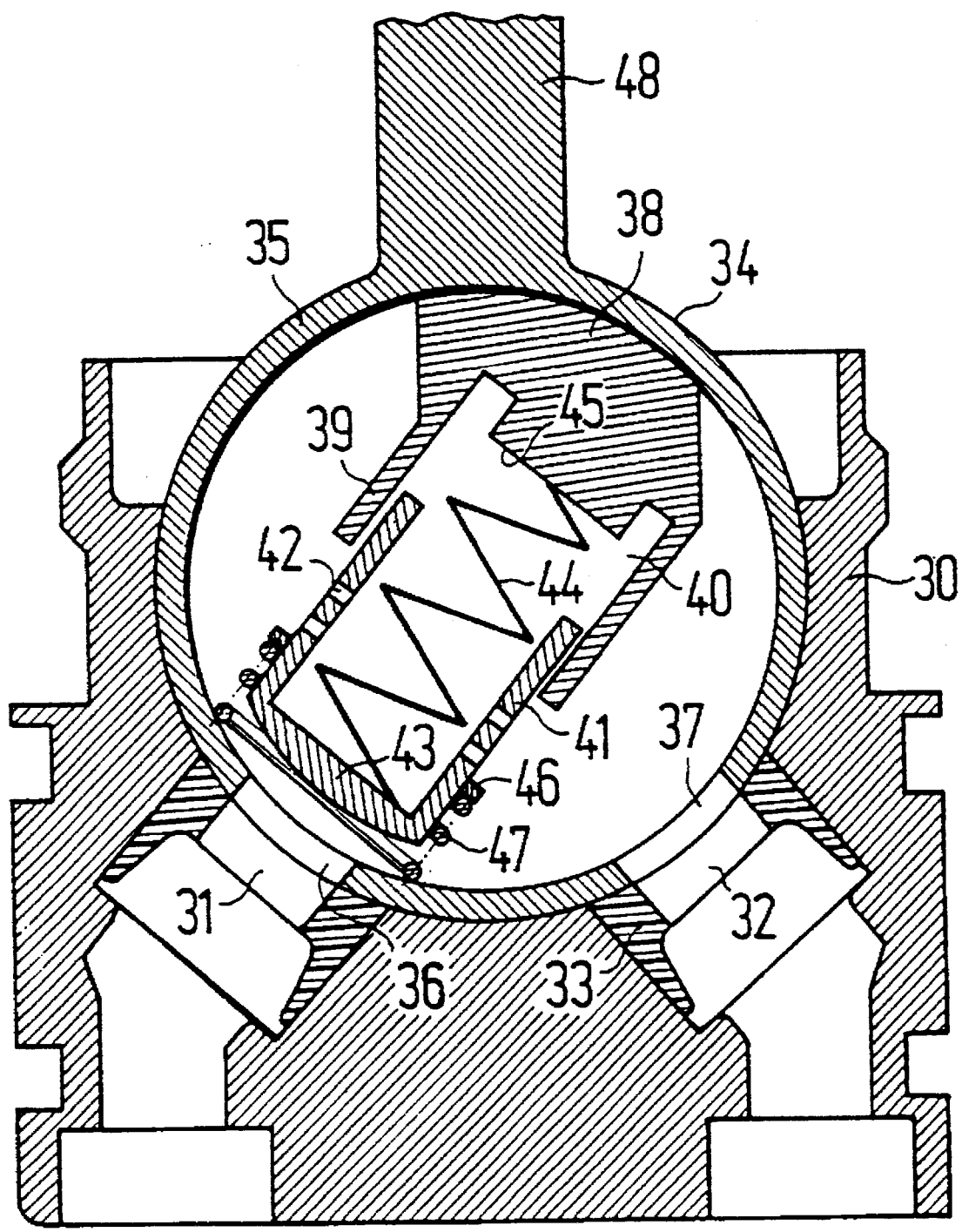

FIG. 4 A simplified section through a mixer valve with a ball plug.

Figure 5:
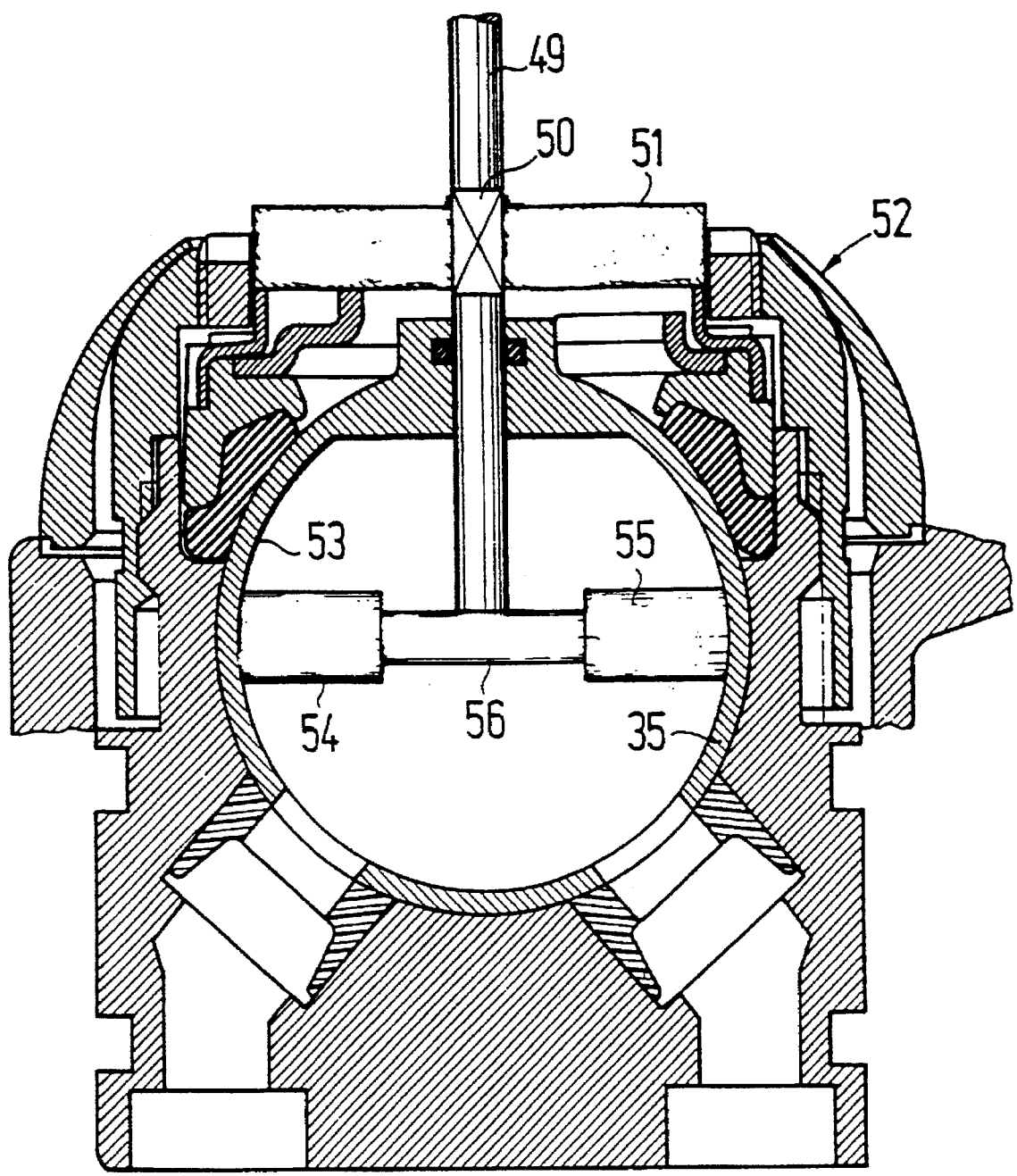

FIG. 5 A section through a second embodiment of a mixer valve with a ball plug.

Figure 6:
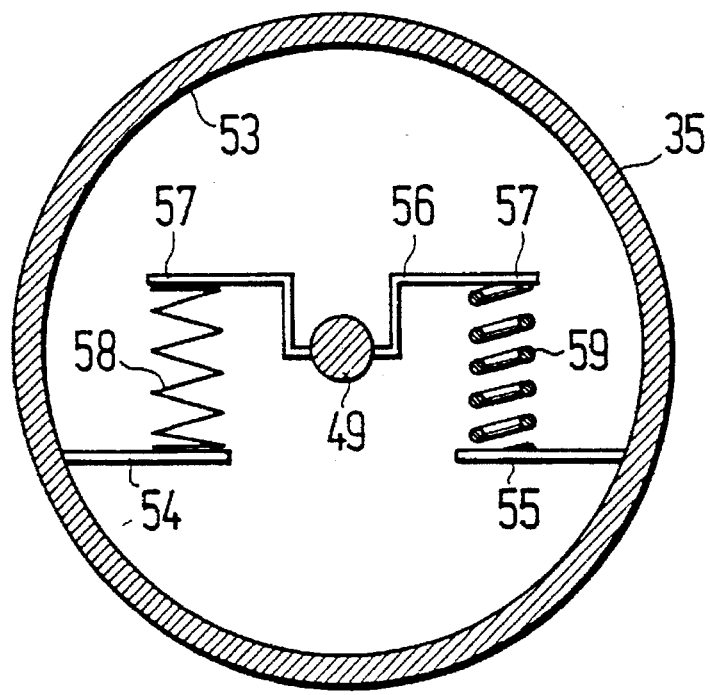

FIG. 6 A section through the ball of FIG. 1 roughly level with its equator.

FIG. 1 shows in section the parts of a sanitary mixer valve which are of interest here. In a not shown housing used for fixing the mixer valve, the latter contains mounting supports for inlet lines, outlet lines, etc. A fixed control disk 1 located in the housing and which can e.g. be made from ceramic forms part of the mixer valve. The control disk contains a hot water intake 2, a cold water intake 3, which is only visible in FIG. 2, as well as a mixed water outlet 4. These three openings issue into the upper surface 5 of the fixed control disk 1 in FIG. 1, said surface 5 forming the actual control surface.

On said control surface 5 slides a second, movable control disk 6, which is also made from ceramic. The control disk 6 is secured on a control element 7, which engages round the control disk 6 along its upper, outer rim and is there sealingly connected thereto. The control element 7 has a lug 8, which is connected directly or by means of a linkage with any operating grip or handle located outside the fitting housing. By means of said operating grip the control element 7, together with the movable control disk 6 can be moved, i.e. slid and rotated with respect to the fixed control disk 1.

The movable control disk 6 contains a central recess 9, which continues in a recess 10 in the control element 7. The recess 9 in the movable control disk forms a control edge 11, shown in broken line form in FIG. 2 and which as a function of the position opens to a greater or lesser extent or closes the intakes 2, 3. This brings about a quantity and temperature control of the mixed water leaving the outlet 4.

In the recess 10 of the control element is provided a temperature sensor 12, which is connected to a valve element 13. With its underside facing the fixed control disk 1 the valve element 13 is located in the common plane of the fixed control surface 5 and the movable control surface 14, the valve element 13 being displaceably mounted. The displacement direction is chosen in such a way that in the case of a position of the control element 7 corresponding to the maximum water temperature the hot water intake 2 is located in the displacement direction of the valve element 13, as shown in FIG. 2. The temperature-sensitive element 12 is constituted by a SMA spring, which acts on a lug 15 of the valve element 13 in the closure direction of the valve element 13 with respect to the intake 2. On the other side of the lug 15 acts a spring steel spring 16, which keeps the lug 15 and therefore the valve element 13 in an equilibrium position. The SMA spring is chosen in such a way that at a predetermined temperature of e.g. 40° C. it performs a sudden movement, which moves the valve element 13 forwards for closing the hot water intake 2.

When the mixer valve is functioning within the recess 9 of the control disk 6 and the recess 10 of the control element 7 the mixing temperature prevails, i.e. the temperature of the water mixed by the control system and leaves the outlet 4. If this water is too hot, then the valve element 13 moves forwards and closes the intake 2. However, if the control element 7 is turned in such a way that the valve element 13 is not oriented in the direction of the hot water intake 2, then this represents a position of the mixer valve in which the cold water intake is also opened, so that an excessive mixing temperature cannot occur.

Thus, the mixer valve of FIGS. 1 and 2, if necessary, closes the hot water intake 2, without the control element 7 or the movable control disk 6 having to be moved.

In the second embodiment of a valve also containing a control disk in FIG. 3 a different construction has been chosen. For simplification reasons the same elements are given the same reference numerals.

The control element 7 has a radial passage 17, which links the interior of the recess 10 with the space outside the control element 7 and the movable control disk 6.

In the cylindrical passage 17 is placed an operating element 18 in the form of a cylindrical tappet 19. This tappet 19 has on its radial inside, which is located within the recess 10, a widened cover plate 20. Between the cover plate 20 and the opposite wall 21 of the recess 10 extends the temperature-sensitive element 12 once again in the form of a SMA compression spring 22. The spring 22 is only represented symbolically. It is held in any random manner on the two parts between which it extends and is also protected against bending out.

The equilibrium with respect to said SMA spring 22 is once again provided by a spring steel compression spring 23, which is located outside the control element 7 and acts between the inner wall 24 of the housing 25 and the outer wall 26 of the control element 7.

If an excessive mixing temperature occurs within the recess 9 or 10, then in a sudden or jerky manner the spring tension of the SMA spring 22 increases and consequently acts via the operating element 18 engaging on the inside 24 of the housing 1 and the inner wall 21 of the control element 7 and consequently moves the operating element 7 in FIG. 1 to the right. Therefore the movable control disk 6 with its control edge 11 is moved over and beyond the hot water intake 2, so that once again there is a closure of the hot water intake and consequently a reduction of the mixing temperature. In this case this does not take place by an additional valve element independently of the control disks, but by a movement of the movable control disk 7 in the same way as if it were to take place through the user.

As in the case of the embodiment of FIGS. 1 and 2, if the temperature of the hot water at the intake 2 drops again, the valve is reset.

Whereas FIGS. 1 to 3 show embodiments with disk valves, the following embodiments show the application of the invention to valves having ball plugs.

The mixer valve, which is also only partly shown, contains a central element 30, which has an inner recess in the form of a hemisphere. Into said hemispherical surface, which represents the fixed control surface, issues a hot water intake 31, a cold water intake 32 and a mixed water outlet located at a different point. The openings contain rubber-elastic material sleeves 33, which are pressed with the aid of not shown compression springs against the outside 34 of a ball plug 35. To this extent the valve is known per se, so that a further description of these details is unnecessary. The ball plug contains an intake 36, which cooperates with the hot water intake 31, an intake 37 cooperating with the cold water intake 32 as well as an outlet located at another point. These can be in the form of several openings.

In the ball plug 35 is fixed a mounting support 38, which with the aid of a cylindrical skirt 39 forms a cylindrical inner space 40, in which is displaceably mounted a plunger element 41, whose cylindrical jacket e.g. has passage openings 42. In the interior of the plunger 41 which is frontally closed by an outwardly slightly convexly curved plate 43 is located a SMA compression spring 44, which acts between the bottom 45 of the inner space 40 and the inside of the plate 43. The hot water intake 36 in the interior of the ball plug 35 faces the outside of the plate 43.

The plunger 41 has on its outside an all-round rib 46, which serves as a stop for the spring steel compression spring 47, which consequently extends between the rib 46 and the inner wall of the ball plug. It acts in the opposite direction to the SMA compression spring 44 and once again produces an equilibrium.

The mixed water temperature prevails within the ball plug 35. The interior of the plunger 41 and the mounting support 38 is also filled with said mixing water, so that the spring 44 has the mixing water temperature. If it exceeds a predetermined critical value, then with its sudden change of state the spring 44 moves the plunger 41 towards the intake 36, so that the plate 43 closes the latter. Once again a scalding protection is provided and on reaching the aforementioned temperature closes the hot water intake in the interior of the ball plug and consequently reduces the mixing water temperature. In much the same way as in the embodiment according to FIGS. 1 and 2 this scalding protection is provided by an additional valve element operating independently of the operation of the mixer valve.

FIG. 5 once again shows a mixer valve with a ball plug, which has a similar construction to the mixer valve of FIG. 4. However, whereas in the case of the mixer valve of FIG. 4 the operation of the normal mixing process takes place by means of a lug 48 connected to the ball plug, in the case of the ball plug of FIG. 5 there is a central operating rod 49, which passes through a sealed opening of the plug 35 and is rotatable with respect to the latter. The operating rod 49 has a square portion 50, which is guided in a connecting link guide 51. Therefore a rotation of the operating rod 49 also leads to a rotation of the connecting link guide 51 with respect to the valve housing 52. The rotation of the ball plug 35 occurring on rotating the operating rod 49 takes place in that on the inner wall 53 of the ball plug and roughly level with the equator two lugs 54, 55 are fitted, on which act a crossbar 56 fitted to the inner end of the rod 49. Details of this operating mode can be gathered from FIG. 6, which shows a cross-section through the ball plug of the arrangement of FIG. 5. The two lugs 54, 55 are displaced somewhat to one side with respect to an axial plane. The crossbar 56 has two wings located in a plane and which are also parallel to lugs 54, 55 in a plane and have a spacing therefrom. Between the wing-like, one end of the crossbar 56 and a lug 54 extends a SMA compression spring 58, whereas on the opposite side is provided a spring steel compression spring 59. At normal temperature below the critical value both springs have the same spring tension, so that a state of equilibrium occurs corresponding to the arrangement of FIG. 6. If the operating rod 49 is now turned in order to change the temperature, initially the crossbar to which the operating rod 49 is firmly connected also turns. Due to the spring tension this is followed by the ball 35. The rotation of the operating rod 49 is accompanied by the rotation of the connecting link guide 51, which takes place immediately due to the mechanical engagement.

If a mixing temperature which has reached the critical value occurs within the ball plug 35, then the SMA spring 58 suddenly develops a higher tension, which attempts to change the parallel position between the crossbar 56 and the lugs 54, 55, i.e. bring about a rotation between the crossbar 56 and plugs 35. However, as the connecting link guide 51 is relatively difficult to move, whereas the rotation of the ball plug 35 is easier, this increase in the tension of the SMA spring 58 leads to the ball plug 35 rotating, whereas the operating rod 49 remains fixed. However, as a function of the arrangement of the openings, this rotation of the ball plug either means a closure of the mixer valve or a rotation in the cold temperature direction. Thus, in both cases through the movement of the mixer valve control element a scalding protection is provided. Once again resetting occurs when the temperature at the hot water intake drops again.

I claim:

1. Sanitary valve comprising:

a valve housing, which has a fixed control surface and a hot water intake, a control element for controlling a water quantity leaving the valve and which is movably arranged with at least one degree of freedom with respect to the housing, and the control element having a movable control surface cooperating with the fixed control surface, and a valve element cooperating with at least one of the fixed control surface and the movable control surface and is constructed for closing the hot water intake.

2. Sanitary valve according to claim 1 comprising a cold water intake wherein the control element is movable with two degrees of freedom and is operable to control a temperature and the quantity of the water leaving the valve thereby forming a single lever mixer valve.

3. Sanitary valve according to claim 1 wherein the valve element has a temperature-sensitive element exposed to water downstream of the hot water intake.

4. Sanitary valve according to claim 3, wherein the temperature-sensitive element is so constructed that it performs a mechanical movement in the case of a temperature change.

5. Sanitary valve according to claim 1 wherein the valve element cooperates with the movable control surface subject to the action of a temperature-sensitive element which is movable with respect to the movable control surface.

6. Sanitary valve according to claim 5, wherein the valve element is constructed for closing the hot water intake issuing into the fixed control surface.

7. Sanitary valve according to claim 5, wherein the valve element is constructed for closing a hot water intake in the movable control surface.

8. Sanitary valve according to claim 1, wherein an operating element subject to action of the valve element is constructed and arranged for moving at least one of the control element and the movable control surface.

9. Sanitary valve according to claim 8, wherein the operating element subject to the action of the valve element is located on the valve housing.

10. Sanitary valve according to claim 8, wherein the operating element subject to the action of the valve element is located on the control element.

11. Sanitary valve according to claim 8, wherein the operating element is so constructed that it moves the control element in a direction of closure of the mixer valve.

12. Sanitary valve according to claim 8, wherein the operating element is so constructed that it moves the control element in a direction of a temperature reduction of the mixer valve.

13. Sanitary valve according to claim 1 comprising two planar control disks.

14. Sanitary valve according to claim 13, wherein the valve element is located on a control recess of at least one of the movable control disk and the control element.

15. Sanitary valve according to claim 1, wherein the control surface comprises a spherical surface.

16. Sanitary valve according to claim 15, wherein the valve element is located in an interior of a ball plug.

17. Sanitary valve according to claim 1, wherein the valve element has a SMA spring which mechanically engages in the case of a temperature change for closing the hot water intake.

18. Sanitary valve according to claim 2 wherein the valve element has a temperature-sensitive element exposed to water downstream of the hot water intake and the cold water intake.

19. Sanitary valve according to claim 18, wherein the temperature-sensitive element is so constructed that it performs a mechanical movement in the case of a temperature change.

* * * * *